United States Patent
Hinz et al.

(10) Patent No.: US 8,235,473 B2
(45) Date of Patent: Aug. 7, 2012

(54) MOTORCYCLE BRAKE SYSTEM

(75) Inventors: Axel Hinz, Neu-Anspach (DE); Günther Vogel, Dreieich (DE)

(73) Assignee: Continental Teves AG & Co., oHG (DE)

( * ) Notice: Subject to any disclaimer, the term of this patent is extended or adjusted under 35 U.S.C. 154(b) by 865 days.

(21) Appl. No.: 12/281,035

(22) PCT Filed: Mar. 1, 2007

(86) PCT No.: PCT/EP2007/051930
§ 371 (c)(1),
(2), (4) Date: Aug. 28, 2008

(87) PCT Pub. No.: WO2007/099139
PCT Pub. Date: Sep. 7, 2007

(65) Prior Publication Data
US 2009/0039701 A1 Feb. 12, 2009

(30) Foreign Application Priority Data

Mar. 4, 2006 (DE) .......................... 10 2006 010 046
May 31, 2006 (DE) .......................... 10 2006 025 327

(51) Int. Cl.
*B60T 8/32* (2006.01)

(52) U.S. Cl. ...................................... 303/137; 303/9.64

(58) Field of Classification Search ................ 303/9.64, 303/137, 11, 113.3, 116.1, 119.1, 9.62
See application file for complete search history.

(56) References Cited

U.S. PATENT DOCUMENTS

| | | | |
|---|---|---|---|
| 4,952,002 A | 8/1990 | Arikawa et al. | |
| 5,281,014 A | 1/1994 | Volz | |
| 6,715,848 B2 * | 4/2004 | Chen et al. | 303/137 |
| 6,837,552 B2 * | 1/2005 | Reuter et al. | 303/122.09 |
| 2002/0125764 A1 | 9/2002 | Sakamoto | |

FOREIGN PATENT DOCUMENTS

| | | |
|---|---|---|
| DE | 3844246 A1 | 7/1989 |
| DE | 198 24 819 A1 | 12/1998 |
| DE | 102 09 984 A1 | 10/2002 |
| DE | 10 2004 010 265 A1 | 5/2005 |
| DE | 10 2005 004 465 A1 | 9/2005 |
| EP | 0 918 004 A1 | 5/1999 |
| EP | 1 277 635 A2 | 1/2003 |
| EP | 1 334 894 A2 | 8/2003 |
| EP | 1 652 744 A2 | 5/2006 |
| JP | 61160343 | 7/1986 |
| JP | 2000006779 | 1/2000 |
| JP | 2000071963 | 3/2000 |
| WO | WO 91/05686 | 5/1991 |

* cited by examiner

*Primary Examiner* — Melanie Torres Williams
(74) *Attorney, Agent, or Firm* — RatnerPrestia

(57) ABSTRACT

A hydraulic motorcycle brake system whose brake circuits are provided with a valve circuit which prevents the pressure which can be generated by the pump from reacting on the manually activated or foot-activated master brake cylinder.

13 Claims, 3 Drawing Sheets

MOTORCYCLE BRAKE SYSTEM

CROSS REFERENCE TO RELATED APPLICATIONS

This application is the U.S. National Phase Application of PCT International Application No. PCT/EP2007/051930 filed Mar. 1, 2007, which claims priority to German Patent Application No. DE102006010046.8 filed Mar. 4, 2006 and German Patent Application No. DE102006025327.2 filed May 31, 2006, the contents of such applications being incorporated by reference herein in their entirety.

BACKGROUND OF THE INVENTION

1. Field of the Invention

The invention relates to a motorcycle brake system.

2. Description of the Related Art

JP 2000071963 A discloses a motorcycle brake system. The brake system has a front wheel brake circuit and a rear wheel brake circuit which can be activated hydraulically and in which brake pressure can be built up in the wheel brakes jointly or independently of one another by means of a foot-activated or manually activated master brake cylinder. In order to control brake slip, inlet valves and outlet valves which can be activated electromagnetically and a two-circuit pump which can be driven by an electric motor are inserted both in the front wheel brake circuit and in the rear wheel brake circuit. In addition, an electric isolating valve and a switchover valve are also provided in each of the two brake circuits, in addition to the inlet valves and outlet valves and the pump, in order, in the case of manual activation of one of the two master brake cylinders, also to be able to build up brake pressure in the brake circuit which is not activated manually, for which purpose the pump and the isolating valve and switchover valve is activated electrically.

A disadvantage of this brake system is the reaction of the pump on the manually activated master brake cylinder, as a result of which it is briefly possible to sense pulsation on the hand brake lever or foot brake lever when the pump starts up.

One object of the present invention is therefore to improve a motorcycle brake system of the specified type in such a way that a reaction of the pump on the manually activated or foot-activated master brake cylinder can be prevented with means which are as simple and functionally reliable as possible.

SUMMARY OF THE INVENTION

This object is achieved for a motorcycle brake system of the specified type by a system having a first manually activated or foot-activated master brake cylinder for hydraulically activating a first brake circuit and a second manually activated or foot-activated master brake cylinder for hydraulically activating a second brake circuit. An inlet valve and an outlet valve are provided for controlling brake slip in each wheel brake of each brake circuit. A low pressure accumulator is arranged in each of the two brake circuits and is respectively connected downstream of the outlet valve on a return line which leads, in each brake circuit, to the suction side of a pump whose pump pressure side is connected to the first and second brake circuits. An isolating valve in each brake circuit, which in an open position, respectively connects the associated master brake cylinder to the pump pressure side and to the associated wheel brake. A switchover valve in each brake circuit, in its open position, respectively connects the associated master brake cylinder to the suction side of the pump. In each of the two brake circuits a valve circuit is provided between the pump and the master brake cylinder. The valve circuit prevents the pressure that can be generated by the pump from reacting on the respectively manually activated or foot-activated master brake cylinder.

These and other aspects of the invention are illustrated in detail by way of the embodiments and are described with respect to the embodiments in the following, making reference to the Figures.

BRIEF DESCRIPTION OF THE DRAWINGS

The invention is best understood from the following detailed description when read in connection with the accompanying drawing. Included in the drawing are the following figures.

DETAILED DESCRIPTION OF THE PREFERRED EMBODIMENTS

Figure 1:
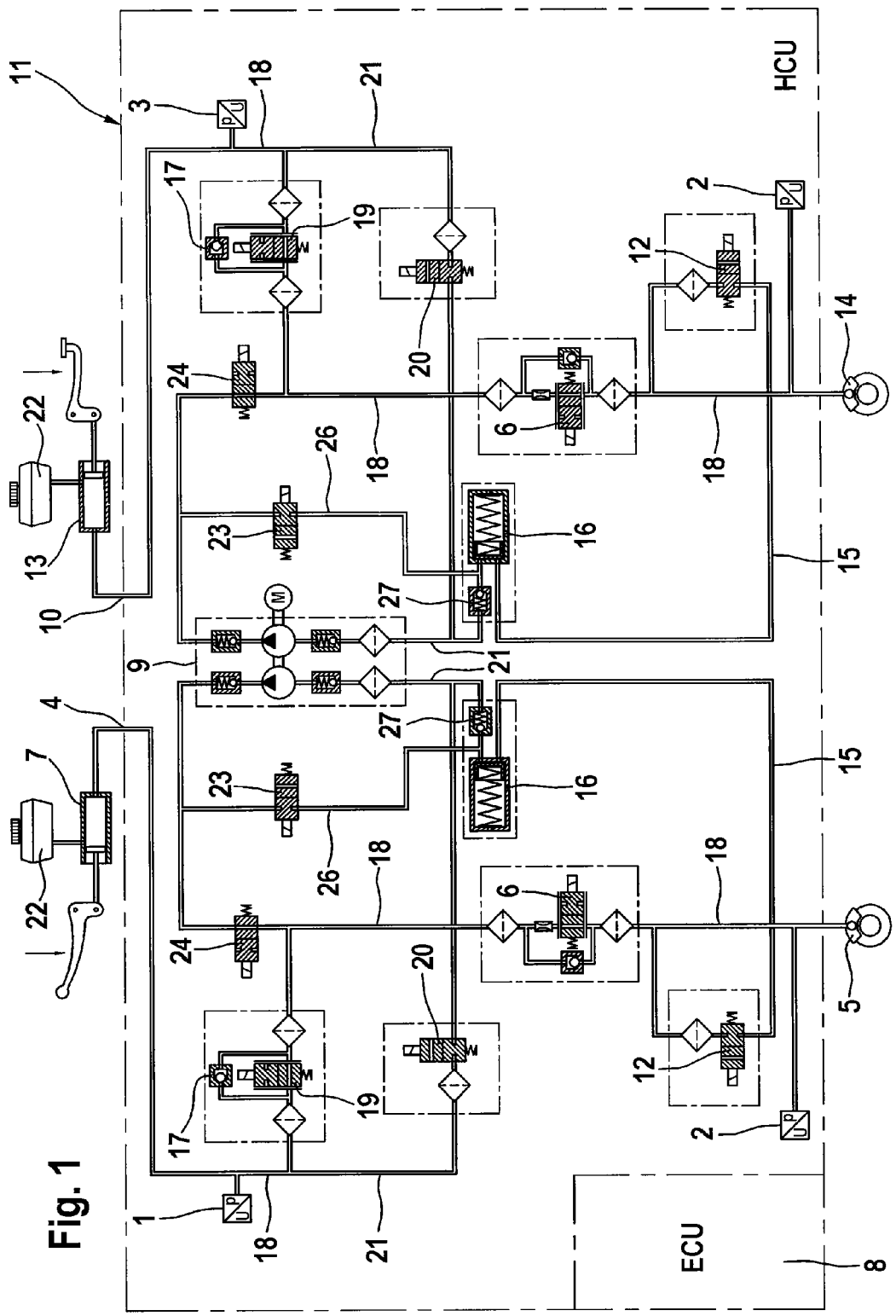
FIG. 1 shows a hydraulic circuit for a motorcycle brake system which, in addition to the valve circuit from the cited prior art, has, in each of the two brake circuits, a pump circulation valve which is arranged outside the pump and a pump check valve, which valves can be activated electrically.

FIG. 1 shows the hydraulic circuit diagram in schematic form with the features for a motorcycle brake system which are essential to the invention. The brake system is composed of a front wheel brake circuit 4 and rear wheel brake circuit 10 which can be activated hydraulically and which respectively have a master brake cylinder 7 which is connected to the front wheel brake circuit 4 and can be activated by manual force, and a master brake cylinder 13, which can be activated in proportion to a foot force, on the rear wheel brake circuit 10 for activating the rear wheel brake 14.

In order to control brake slip, inlet and outlet valves 6, 12 which can be activated electromagnetically are arranged in both the front wheel brake circuit 4 and in the rear wheel brake circuit 10, wherein in each case the inlet valve 6 which is opened in the home position is inserted into the brake line of the front wheel brake circuit 4 and of the rear wheel brake circuit 10, which line connects the respectively associated master brake cylinder 7, 13 via an isolating valve 19 to the front wheel brake 5 or the rear wheel brake 14. The outlet valve 12 which is closed in the home position is respectively inserted into a return line 15 of each brake circuit, which return line 15 connects the front wheel brake 5 or rear wheel brake 14 to, in each case, a low pressure accumulator 16 and to the suction path 21 of a pump 9 which is divided into two circuits and which operates according to the feedback principle. The pump 9 is connected on the pressure side to the brake lines 18 of the two brake circuits, with the result that it is ensured, in a brake-slip control phase, that the brake fluid volume which is respectively let out from the front wheel brake 5 or rear wheel brake 14 is fed back according to demand into the brake lines 18 of the two brake circuits. The pump pistons of the two pump circuits are driven jointly by an electric motor 2, with the result that, without the valve circuit according to the invention which is to be explained in more detail below, the pulsation of the pump pressure would react in an unimpeded way either on the manually activated brake lever or the foot-activated brake pedal even in the case of slip-free braking when the pump starts up.

The two brake circuits 4, 10 can, in accordance with their circuit design, be activated either jointly or independently of one another, with the particular feature that, for example in the case of manual activation of the master brake cylinder 7 which is connected to the front wheel brake circuit 4, not only a brake pressure build up in the front wheel brake 5 but at the same time also an electrohydraulic increase in brake pressure occurs in the rear wheel brake 14 by virtue of the fact that the electric motor 2 activates the pump 9 and, as a result of the switchover position, initiated electrically in the rear wheel brake circuit 10, of the isolating valve 19 and switchover valve 20, the pump 9 takes in pressure medium from the master brake cylinder 13 and feeds it to the rear wheel brake 14, while the isolating valve 19 disconnects the pump pressure side from the master brake cylinder 13. As a result of the forced coupling of the two pump circuits, without the features of the invention which are to be explained, it would therefore be possible to sense pulsation at the master brake cylinder 7, which is of short duration in a slip-free normal braking operation owing to the closed position of the outlet valve and switchover valve.

The aforementioned activation example can, of course, also be reversed in that, according to the same system, braking at the front wheel brake 5 which is initiated electrohydraulically by the starting of the pump is triggered by the activation of the master brake cylinder 13 which is connected to the rear wheel brake 10, in which case it would be possible to sense pulsation at the master brake cylinder 13 if the features of the invention were not present.

It follows from this that when one of the two master brake cylinders 7, 13 is activated, the brake circuit which is respectively not activated by the driver is placed under pressure by the two-circuit pump 9 in a way which permits remote, electrohydraulic actuation even for the purpose of slip-free braking, with the result that both the front wheel brake and the rear wheel brake contribute actively to the braking deceleration if just one of the two master brake cylinders 7, 13 is activated.

In order to sense the pressure which is applied by the master brake cylinder 7 to the front wheel brake circuit 4, a pressure sensor 1 is generally used. Monitoring of the pressure which is applied manually to the rear wheel brake circuit is also carried out by means of a pressure sensor 3 which is arranged in the vicinity of the master brake cylinder 13. In order to reliably monitor the wheel brake pressure and at the same time perform analog control of the inlet valves 6 with the emphasis on comfort, both brake circuits 4, 10 are additionally provided with two pressure sensors 2, 30 which sense the wheel brake pressure.

When the front wheel brake circuit 4 is activated manually, the master brake cylinder pressure which is sensed by means of the pressure sensor 1 in the front wheel brake circuit 4 forms the guide variable for the electrical activation of the pump 9 which is inserted in the rear wheel brake circuit 10 and which, by interaction with the inlet valves and outlet valves 6, 12, the isolating valve 19 and the switchover valve 20, performs automatic brake pressure control in the rear wheel brake circuit 10 according to an electronic brake force distribution characteristic curve which is stored in the control unit 8, if the master brake cylinder 7 which is connected to the front wheel brake circuit 4 is activated exclusively.

It applies analogously that in the case of exclusive manual activation of the rear wheel brake circuit 10, the pressure sensor 3 which is arranged on the master brake cylinder 13 of the rear wheel brake circuit 10 forms the guide variable for the electrical activation of the pump 9 which is inserted into the front wheel brake circuit 4, of the inlet and outlet valves 6, 12 and of the switchover valve 20 and the isolating valve 19.

In order to evaluate the pressure sensor signals, a logic circuit is provided in the electronic control unit 8 in which a hydraulic pressure is generated as a function of the evaluation result of the pressure sensor signals by means of the pump 9 which can be activated electrically.

The control unit 8 which is illustrated symbolically preferably forms an integral component of a brake unit 11 which has the front wheel brake circuit 4 and rear wheel brake circuit 10 and which is embodied structurally as a monolithic block. In one expedient embodiment, in order to make electrical contact the control unit 8 is plugged onto the inlet and outlet valves 6, 11, switchover valve 20 and isolating valve 19 which are integrated into the brake unit 11. By virtue of the particularly compact design, the brake unit 11 can therefore be attached to a motorcycle frame in the vicinity of a battery.

For slip-controlled braking, basically the following applies:

1. An inclination of the front wheel or rear wheel to lock is reliably detected by means of wheel speed sensors and their signal evaluation in the control unit 8. The inlet valve 6 which is arranged in the front wheel brake circuit 4 or rear wheel brake circuit 10 is closed electromagnetically by means of the control unit 8 in order to prevent a further increase in pressure in the front wheel brake circuit 4 and rear wheel brake circuit 10.
2. If, in order to reduce the inclination to lock, a further decrease in pressure is additionally necessary in the front wheel brake circuit 4 or rear wheel brake circuit 10, this is achieved by the opening of the outlet valve 12 which is normally closed in the currentless state and which can be respectively connected to the low pressure accumulator 16. The outlet valve 12 is closed as soon as the wheel acceleration increases beyond a specific degree. In the pressure reduction phase, the corresponding inlet valve 6 remains closed, with the result that the master brake cylinder pressure which is generated in the front wheel brake circuit 4 or rear wheel brake circuit 10 cannot propagate to the front wheel brake circuit 4 or rear wheel brake circuit 10.
3. If the slip values which are determined again permit an increase in pressure in the front wheel brake circuit 4 or rear wheel brake circuit 10, the outlet valve 12 is closed again and the inlet valve 6 is opened in a chronologically limited fashion in accordance with the request of the slip controller which is integrated in the control unit 8. The hydraulic volume which is necessary for the increase in pressure is made available by the pump 9.
4. During the slip-free and slip-controlled braking process, the isolating valve 19 and the switchover valve 20, which are arranged downstream of the manually activated master brake cylinder, remain in their illustrated home position, while the isolating valve 19 and switchover valve 20, which are arranged downstream of the nonactivated master brake cylinder, are excited electromagnetically and assume their reversal position, as a result of which the pump 9, which is activated electrically, in the electrohydraulically actuated brake circuit extracts pressure medium from the nonactivated master brake cylinder via the opened switchover valve without being able to feed it back into the nonactivated master brake cylinder owing to the closed position of the associated isolating valve 19 which is brought about electromagnetically.

Irrespective of which of the two master brake cylinders 7, 13 is activated manually, the invention provides that, in the brake circuit which is activated manually by means of the associated master brake cylinder 7, 13, a pump circulation valve 23 assumes, in conjunction with a pump check valve 24 (or in conjunction with a nonreturn valve 25) a switched position, at the start of the operation of the pump, in which a reaction of the pressure generated by the pump 9 on the manually activated or foot-activated master brake cylinder 7, 13 is prevented.

Figure 2:
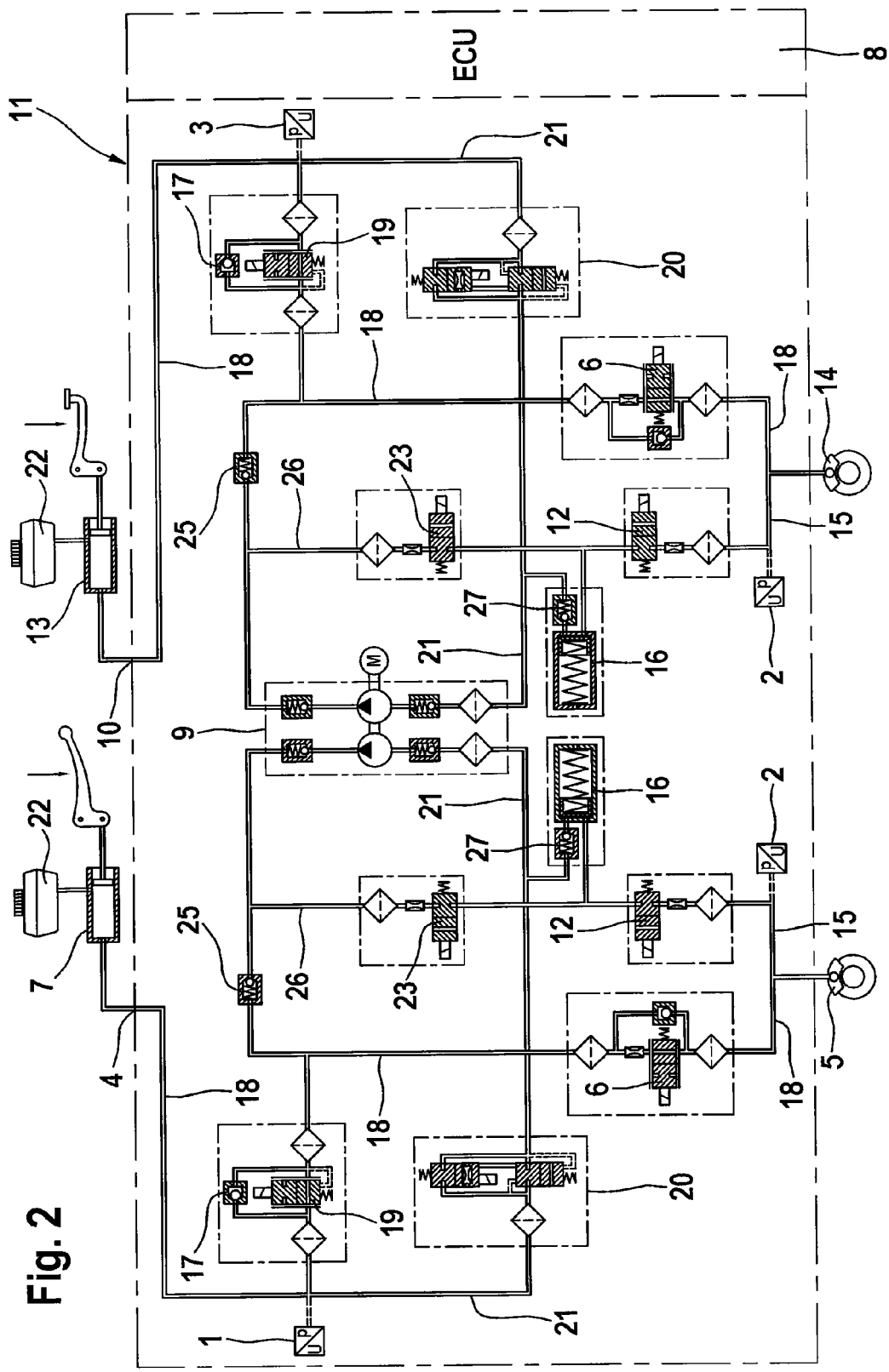
FIG. 2 shows a circuit design which is simplified compared to FIG. 1 and in which the pump check valve has been replaced by a nonreturn valve which can be activated exclusively hydraulically.
Figure 3:
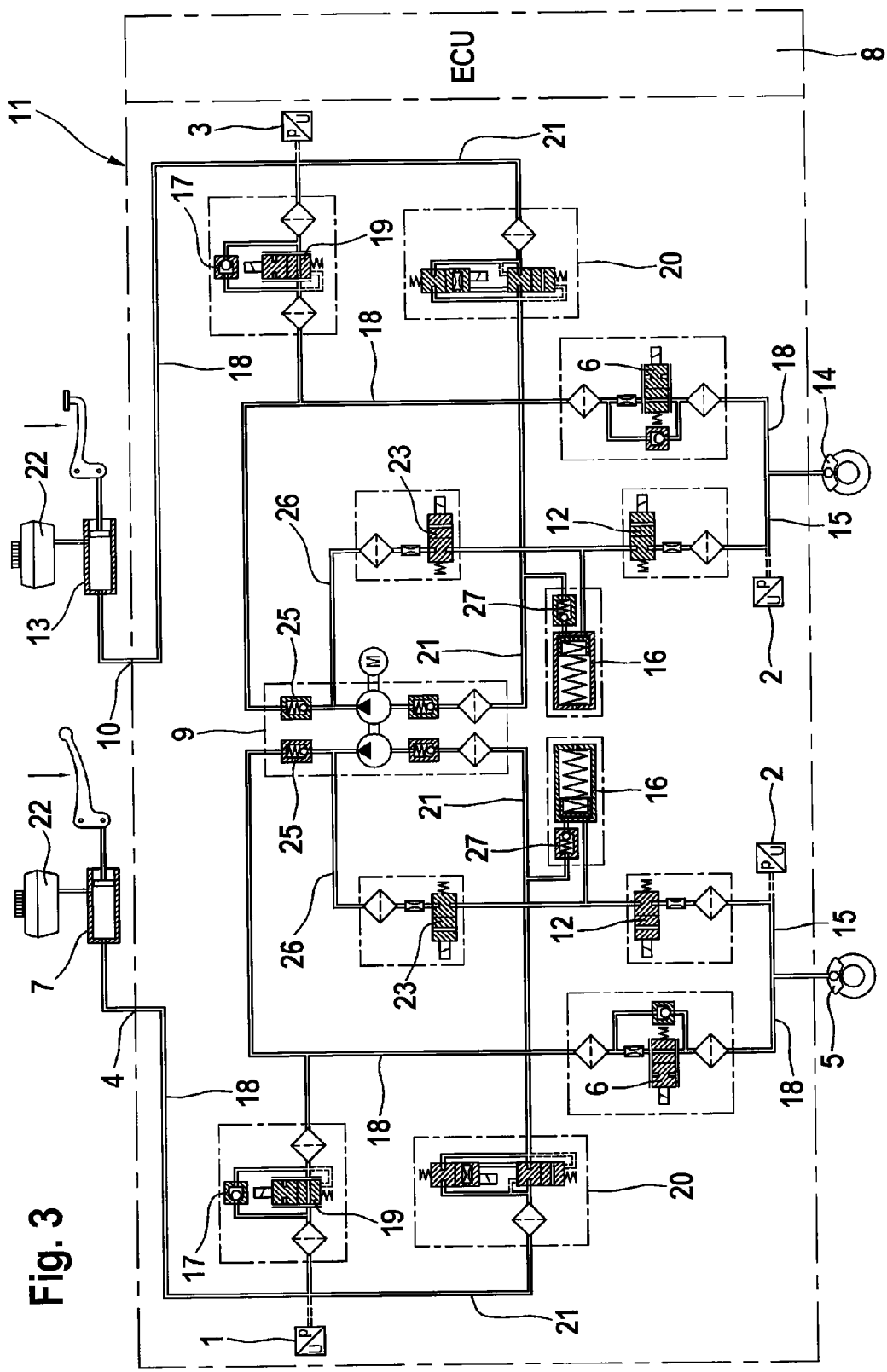
FIG. 3 shows, in contrast to FIG. 2, the connection of the pump circulation valve directly to the compression space of the pump, in which case the pump pressure valve performs the function of the nonreturn valve which is known from FIG. 2.

For this purpose, either at the start of the operation of the pump in the manually activated or foot-activated brake circuit, either the pump check valve 24 according to FIG. 1 or the nonreturn valve 25 according to FIGS. 2, 3 assumes, in the pump pressure line, a closed switched position while the pump circulation valve 23 is simultaneously opened, as a result of which a reaction of the pressure which is generated by the pump 9 on the manually activated or foot-activated master brake cylinder 7, 13 is easily prevented.

In all the exemplary embodiments, the isolating valves 19 which are opened in the home position, the switchover valves 20 which are closed in the home position, the inlet valves 6 which are opened in the home position and the outlet valves 12 which are closed in the home position are embodied as 2/2 way valves which can be activated electrically and which respectively remain in their illustrated home position in a very simple way by means of a spring. In addition, a nonreturn valve 17 which opens in the direction of the wheel brake 5, 14 is arranged parallel to each of the two isolating valves 19, as a result of which an increase in brake pressure can occur at any time via the connected master brake cylinder 7, 13 independently of the position of the isolating valve.

In addition, it is the case for all the exemplary embodiments according to FIGS. 1-3 that the valve circuit has, as an essential element, the pump circulation valve 23 which, in each of the two brake circuits, is inserted into a line path 26 which respectively produces a bypass connection between a suction side and a pressure side of the pump 9. The pump circulation valve 23 is embodied as a 2/2 way seat valve which is closed in the home position and which, during the operation of the pump, is opened electrically in that particular brake circuit whose master brake cylinder (7 or 13) is activated either manually or by the foot.

In FIG. 1, the hydraulic connection of the pump pressure side can be disconnected electrically from the connected master brake cylinder 7, 13 downstream of each line path 26 by means of a pump check valve 24 which is arranged in series with the isolating valve 19. The pump check valve 24 is embodied as a 2/2 way valve and assumes its open position with support by spring force in its home position for the purpose of unimpeded distribution of the brake fluid.

Given corresponding adaptation of the control unit 8, the function of the pump check valve 24 can also be carried out by the isolating valve 19 itself, with the result that it is not absolutely necessary to connect the isolating valve and pump switchover valve 24 in series.

The line path 26 is connected to the pump suction side upstream of a pressure retaining valve 27 at the output of the low pressure accumulator 16. The low pressure accumulator 16 therefore acts advantageously as a buffer for the pressure pulses of the pump 9 which propagate into the low pressure accumulator 16 via the open pump circulation valve 23.

The hydraulic circuits according to FIGS. 2 and 3 differ from FIG. 1 in the use of a spring-loaded nonreturn valve 25 instead of the pump check valve 24 which can be activated electrically. The nonreturn valve 25 does not open until there is a pressure of approximately 5 bar in the direction of the connected master brake cylinder 7, 13, with the effect that during uncontrolled slip-free manual activation of the brakes the low pump pressure is not capable of opening the nonreturn valve 25 owing to the closed switchover valve 20 and outlet valve 12, which reliably prevents a reaction on the master brake cylinder 7, 13.

According to FIG. 2, in the hydraulic circuit the nonreturn valve 25 is inserted, as a component which is structurally detached from the pump 9, into the pump pressure line downstream of the pump pressure valve and pump circulation valve, said pump pressure line leading to the brake line 18.

In contrast to the hydraulic circuit according to FIG. 2, the nonreturn valve 25 in FIG. 3 takes the place of the pump pressure valve within the pump 9. The line path 26 which has the pump circulation valve 23 is therefore connected directly to the compression space of the pump 9.

Wherever information has not been given hitherto on all the details illustrated in FIGS. 2 and 3, said details correspond to the features explained in FIG. 1.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A motorcycle brake system comprising:
   a first master brake cylinder for hydraulically activating a first brake circuit;
   a second master brake cylinder for hydraulically activating a second brake circuit;
   a pump having a suction side and a pressure side that is connected to the first brake circuit and the second brake circuit;
   each brake circuit including:
      an inlet valve and an outlet valve for controlling brake slip of a wheel brake;
      a low-pressure accumulator connected downstream of the outlet valve on a return line that leads to the suction side of the pump;
      an isolating valve configured to selectively connect an associated master brake cylinder to the pressure side of the pump and to a wheel brake;
      a switchover valve configured to selectively connect the associated master brake cylinder to the suction side of the pump; and
      a valve circuit between the pump and the associated master brake cylinder, the valve circuit configured to prevent pressure generated by the pump from reacting on an activated master brake cylinder.

2. The motorcycle brake system as claimed in claim 1, wherein each valve circuit includes a pump circulation valve inserted into a line path for producing a bypass connection between the suction side and the pressure side of the pump.

3. The motorcycle brake system as claimed in claim 2, wherein the line path is connected to the pressure side of the pump between an outlet of the pump and a spring-loaded non-return valve.

4. The motorcycle brake system as claimed in claim 3, wherein the spring-loaded non-return valve is configured to be opened upon reaching a defined opening pressure.

5. The motorcycle brake system as claimed in claim 3, wherein upon activating an associated master brake cylinder, the pump circulation valve assumes its electrically opened switched position and the non-return valve assumes its closed switched position.

6. The motorcycle brake system as claimed in claim 2, wherein the pump circulation valve is a two-way valve that is configured to be opened upon activating an associated master brake cylinder.

7. The motorcycle brake system as claimed in claim 2, wherein a connection between the pressure side of the pump and the associated master brake cylinder is configured to be disconnected downstream of the line path either by the isolating valve or a pump check valve that is arranged in series with the isolating valve.

8. The motorcycle brake system as claimed in claim 7, wherein upon activating an associated master brake cylinder, the pump circulation valve assumes its electrically opened switched position and the pump check valve assumes its closed switched position.

9. The motorcycle brake system as claimed in claim 2, wherein the switchover valve is configured to be coupled to the associated master brake cylinder, the suction side of the pump and the pressure side of the pump for the purpose of venting and filling the suction side of the pump with brake fluid.

10. The motorcycle brake system as claimed in claim 2, wherein the line path is connected to the low pressure accumulator in a region of the suction side of the pump.

11. The motorcycle brake system as claimed in claim 10, further comprising a pressure retaining valve that is connected to an output of the low pressure accumulator, wherein the pressure retaining valve is configured to open in the direction of the suction side of the pump.

12. The motorcycle brake system as claimed in claim 1, wherein the first master brake cylinder is either manually activated or foot activated.

13. The motorcycle brake system as claimed in claim 1, wherein the second master brake cylinder is either manually activated or foot activated.

* * * * *